May 5, 1970  R. L. HENZMAN  3,509,704
CABLE-TYPE CUTTER
Filed Oct. 19, 1967
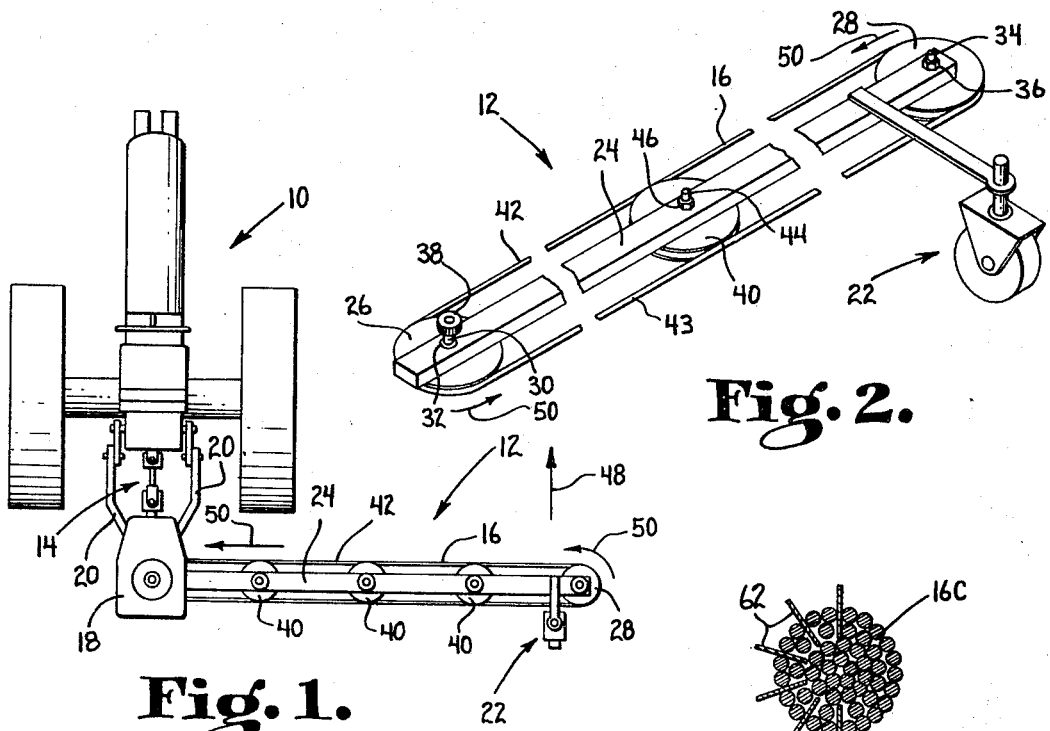
Fig. 1.
Fig. 2.
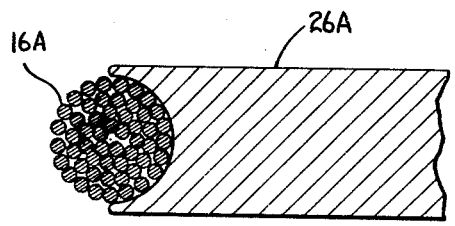
Fig. 3.
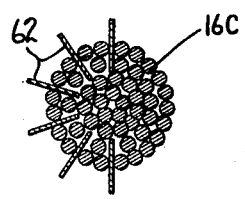
Fig. 5.
Fig. 6.
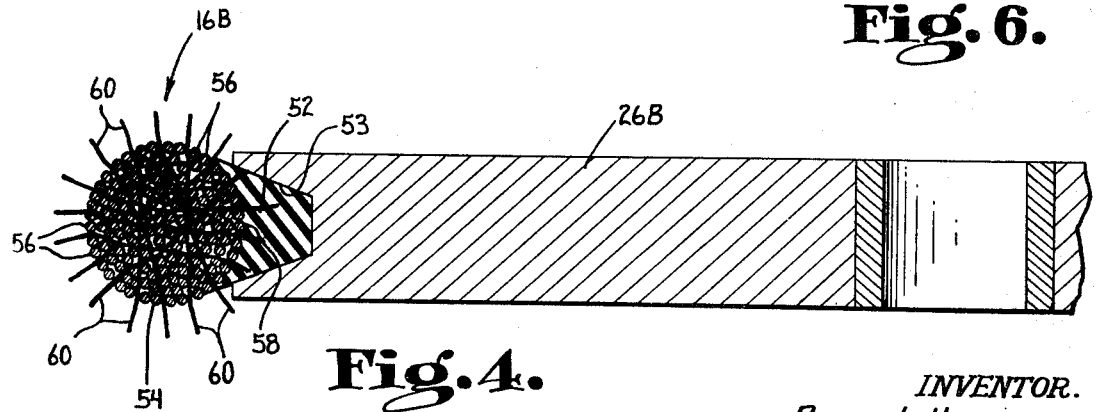
Fig. 4.
INVENTOR.
RAMEY L. HENZMAN
BY Hood, Gust & Irish
Attorneys United States Patent Office 3,509,704
Patented May 5, 1970

3,509,704
CABLE-TYPE CUTTER
Ramey L. Henzman, Fairland, Ind.
(R.R. 3, Dale, Ind. 47523)
Filed Oct. 19, 1967, Ser. No. 676,514
Int. Cl. A01d 55/24
U.S. Cl. 56—291                    3 Claims

ABSTRACT OF THE DISCLOSURE

A cutter assembly comprising a frame, a pair of spaced-apart rotors journalled for rotation on the frame about generally parallel axes, and endless means trained about the rotors to define a first run disposed outwardly from the frame, the endless means being drivingly associated with at least one of the rotors. The first run of the endless means is effective as a cutting means when the endless means is driven. Preferably, the endless means comprises a plurality of strands bundled together to define a cable and a plurality of resiliently flexible pieces randomly dispersed in the strands and extending outwardly therefrom to provide a jagged surface.

---

It is a primary object of my invention to provide a cable-type cutter for use as a mower for cutting grass, hay, corn stalks, etc.

My cable-type cutter is preferably driven at high speeds and is trained about a pair of generally horizontally disposed pulleys so that one run of the cable is presented as a horizontally extending cutting means.

In the preferred embodiment of my invention, the cable-type cutter comprises an endless cable formed by a plurality of strands twisted or otherwise bundled together and a plurality of spring steel pieces dispersed in the strands and extending outwardly therefrom to provide a jagged surface.

Prior art cable-type cutters generally comprise an endless element which carries separate teeth, or the equivalent thereof, the arrangement being such that the teeth exclusively do the cutting, while the endless element serves only as a carrier for the cutting teeth. My cutter is an improvement over the prior art in that I rely on the endless element itself to do the cutting. In some cases, it may be desirable to form my endless element with a plurality of small, resiliently flexible, thin-edged pieces extending minutely therefrom, thereby to enhance its cutting capability.

Other objects and features of the present invention will become apparent as the description progresses.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

In the drawings:

FIG. 1 is a top view of a conventional agricultural tractor fitted with my cable-type cutter;

FIG. 2 is an enlarged perspective view of my cable-type cutter;

FIG. 3 is a fragmentary sectional view showing a simple wire cable drivingly seated in a fragment of a pulley;

FIG. 4 is a fragmentary sectional view, approximately to scale, showing a modified form of a cable bonded to a V-belt which is drivingly seated in the groove of a V-pulley about which the belt is trained;

FIG. 5 is a sectional view of another form of cable provided with a preferred form of projecting pieces; and FIG. 6 is a plan view of such a piece.

Referring particularly to FIG. 1, it will be seen that I have illustrated a conventional farm tractor, indicated generally by the reference numeral 10, to which is attached my cutter, indicated generally by the reference numeral 12. The tractor 10 is provided with a conventional power take-off unit, indicated generally by the reference numeral 14, which may be used to drive the cutter 12. Since the endless cutting element 16 of the cutter 12 is preferably driven at high speeds, the power take-off 14 is connected through a gear box 18 to the cutter 12. As illustrated, the gear box 18 is connected to the tractor 10 by the members 20 and serves as a support for the proximal end of the cutter 12. Further, as illustrated, the distal end of the cutter 12 may be supported by a caster indicated generally by the reference numeral 22.

The specific means for mounting the cutter 12 on a tractor and means for driving the cutter 12 are not a part of my invention and, therefore, need not be discussed, in detail, in this description.

The cutter 12 comprises frame means which, in the illustrative embodiment, is the member 24. This member 24, which may be fabricated from structural steel, determines the length of the cutter 12.

Referring to FIG. 2, it will be seen that there is a pair of spaced-apart V-pulleys 26 and 28 journalled for rotation on the member 24 about generally parallel axes, the V-pulley 26 being located at the proximal end of the member 24 and the V-pulley 28 being located at the distal end of the member 24. Specifically, the V-pulley 26 is mounted for rotation with a vertically extending shaft 30 which is journalled in the member 24 by means of the bearing 32 and the V-pulley 28 is journalled on a vertically extending shaft 34 which is secured to the member 24 by means of the illustrated nut 36. Mounted on the upper end of the shaft 30 is a pinion gear 38 which serves as a means for drivingly connecting the V-pulley 26 to the gear box 18.

It may be desirable to provide one or more V-pulleys, such as indicated by the reference numeral 40, journalled on the member 24 between the V-pulleys 26 and 28, these pulleys 40 serving to keep the forward run 42 of the endless element 16 in substantially a straight line. As shown in FIG. 2, each of these pulleys 40 is journalled on a vertically extending shaft 44 which is secured to the member 24 by means such as the illustrated nut 46.

When the cutter 12 is moved in the direction of the arrow 48, and the endless element 16 is driven as indicated by the arrows 50, the forward run 42 of the endless element 16 will engage and cut grass, hay, corn stalks and the like.

Because of the high velocity at which the endless element 16 may be driven, quite satisfactory results can be obtained through the use of a conventional wire cable 16A, running in grooved pulleys 26A of the character suggested in FIG. 3. Any well-known means may be provided for keeping the cable tight enough so that it will be effectively driven by rotation of said pulley; and relatively stiff grasses and grains will be effectively mowed by such a cable as the tractor 10 moves at conventional speeds through a field.

For mowing softer grasses, and for clearing underbrush and the like, however, I believe that it is desirable to enhance the cutting effect of the endless element by anchoring therein a multiplicity of thin, resiliently flexible pieces projecting minutely from at least the forwardly-presented face of the endless element. Further, in order to minimize wear between the parts of the cutter, I prefer to bond the cable to a Ruberoid V-belt and to use V-pulleys of the character suggested at 26B in FIG. 4.

Referring now to FIG. 4, a preferred form of endless element 16B will be discussed. The preferred endless element 16B comprises a Ruberoid V-belt 52 which is received in the V-grooves 53 of the pulleys such as 26B. A cable 54 formed by a plurality of twisted steel wires 56 is suitably bonded or otherwise connected perimetrally about the dished outer face 58 of the V-belt 52.

In order to enhance the cutting capability of the cable 54, a plurality of resiliently flexible pieces, such as the spring steel wires 60 is randomly dispersed in between the twisted steel wires 56 forming the cable 54, whereby said pieces are firmly anchored in the cable body, at least one end of each wire 60 extending outwardly from the cable 54 to give the cable a jagged surface. Preferably, the wires 60 will extend outwardly from the cable 54 from one-eighth to one-fourth inch.

A further form of cable 16C is illustrated in FIG. 5; and it will be apparent that this form of cable may be used either with the form of pulley 26A illustrated in FIG. 3 or with a belt 52 and V-pulley as illustrated in FIG. 4. A multiplicity of thin, resiliently flexible pieces 62, fabricated from spring steel and similar in shape and size to glazier's tacks, can have their bases embedded, and thus anchored, in the cable body during the production of the cable, with their apices projecting slightly from that surface of the cable which will be outwardly presented when the cable is trained about the pulleys, with or without an intervening belt.

Preferably, the frame or bar 24 will be mounted for oscillation about the axis of the shaft 30, with suitable means (not shown) for resiliently yieldably retaining it normally in the illustrated position relative to the tractor 10.

What is claimed is:

1. A cutter assembly comprising frame means, a pair of spaced-apart rotors journalled for rotation on said frame means about generally parallel axes, and an endless cable trained about said rotors to define a first run disposed outwardly from said frame means, said cable being drivingly connected to one of said rotors, said one rotor being adapted to be connected to a driving means, and said first run being effective as a cutting means when said cable is driven, said rotors being V-pulleys, a V-belt trained about said pulleys, said cable being connected perimetrally about the outer face of said belt, said cable comprising a plurality of bundled strands and a plurality of resiliently flexible, thin pieces anchored among said strands and extending outwardly therefrom to provide a jagged cable surface.

2. A cutter as in claim 1 wherein said strands are steel wires and wherein said pieces are spring steel wires.

3. A cutter as in claim 1 wherein said strands are steel wires and wherein said pieces are flat, triangular bits of spring steel having their bases embedded among said strands and having their apices projecting minutely from the surface of said cable remote from said belt.

References Cited

UNITED STATES PATENTS

| 497,400 | 5/1893 | Barclay | 125—21 |
| 1,954,905 | 4/1934 | Wheat | 143—135 |
| 2,619,994 | 12/1952 | Lower | 56—244 XR |
| 3,150,470 | 9/1964 | Barron | 125—21 XR |

FOREIGN PATENTS

| 368,953 | 10/1906 | France. |
| 10,946 | 10/1908 | Great Britain. |
| 923,230 | 2/1947 | France. |
| 1,011,968 | 4/1952 | France. |
| 1,088,408 | 9/1960 | Germany. |

RUSSELL R. KINSEY, Primary Examiner

U.S. Cl. X.R.

56—244; 125—21; 143—135